(12) United States Patent
Matsukura et al.

(10) Patent No.: US 7,634,573 B2
(45) Date of Patent: Dec. 15, 2009

(54) CUSTOMER REQUEST MANAGEMENT METHOD, DEVICE AND COMPUTER PRODUCT

(75) Inventors: Ryuichi Matsukura, Kawasaki (JP); Kazuki Matsui, Kawasaki (JP); Tomonori Ikeya, Kawasaki (JP); Shingo Fujimoto, Kawasaki (JP); Ryosuke Miyata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 847 days.

(21) Appl. No.: 10/636,809

(22) Filed: Aug. 8, 2003

(65) Prior Publication Data
US 2004/0073669 A1    Apr. 15, 2004

(30) Foreign Application Priority Data
Aug. 28, 2002   (JP)   ............................... 2002-249395

(51) Int. Cl.
*G06F 15/16* (2006.01)
*G06F 15/173* (2006.01)
*G06F 15/177* (2006.01)

(52) U.S. Cl. ......................................... 709/229; 705/6

(58) Field of Classification Search ......... 709/217–229, 709/200–203; 705/6, 26, 10; 379/266.01
See application file for complete search history.

(56) References Cited

U.S. PATENT DOCUMENTS 7,245,716 B2 *   7/2007   Brown et al. ........... 379/266.01
2003/0103619 A1 *   6/2003   Brown et al. ........... 379/266.01
2003/0108185 A1 *   6/2003   Brown et al. ........... 379/266.01
2003/0233278 A1 *   12/2003   Marshall ....................... 705/14
2004/0044585 A1 *   3/2004   Franco ......................... 705/26
2005/0251440 A1 *   11/2005   Bednarek ..................... 705/10

FOREIGN PATENT DOCUMENTS

JP   2001-312393   11/2001
JP   2002-033861   1/2002

OTHER PUBLICATIONS

USPTO U.S. Appl. No. 09/817,535, filed Mar. 26, 1001, pp. 1-101.*
Japanese Patent Office Action, dated Feb. 7, 2006, pp. 1-3.

* cited by examiner

*Primary Examiner*—Haresh N Patel
(74) *Attorney, Agent, or Firm*—Staas & Halsey LLP

(57) ABSTRACT

Method for altering service-provision sequence without leaving customers with a sense of unfairness. Question data Q1, Q2 containing question content, priority level, membership number, and other information is transmitted from questioner terminals 2*a*, *b* (#2, 5). An alter-sequence request to switch the sequential order of question data Q2 to a higher rank is transmitted from questioner terminal 2*b* to question administration server 1 (#7). An inquiry with questioner terminal 2*a* as to changing sequential order according to priority levels for question data Q1 and question data Q2 is conducted (#8). When a notice indicating that a sequence change will be permitted is transmitted from questioner terminal 2*a* (#9), the sequential orders for question data Q1 and for question data Q2 are interchanged, and question terminal 2*b* is notified to the effect that the sequence has been changed (#10).

23 Claims, 19 Drawing Sheets

| Seq. | Date/time Rec'vd. | Questioner | Question content | Current points | Priority level | Sequence switching | Group |
|---|---|---|---|---|---|---|---|
| 1 | 2002/7/22/AM10:00 | Taro Fujitsu | Are A Corp.'s and B Corp.'s products interconnectable? | 0 | 1 | not yet | 1 |
| 2 | 2002/7/22/AM10:01 | Hanako Yamada | My data has disappeared. | 3 | 5 | not yet | 1 |
| 3 | 2002/7/22/AM10:02 | Jiro Tanaka | My fan won't spin. | 2 | −3 | done | 1 |
| 4 | 2002/7/22/AM10:03 | Saburo Suzuki | The power won't come on. | 5 | 2 | not yet | 2 |
| 5 | 2002/7/22/AM10:04 | Shiro Kobayashi | Please tell me how to replace the HDD unit | 1 | −6 | not yet | 2 |
| 6 | 2002/7/22/AM10:05 | Goro Ohta | Can you reissue the warranty for me? | 0 | −4 | not yet | 2 |
| ... | ... | ... | ... | ... | ... | ... | ... |

Fig. 2

Login Screen

Membership No. [____]

Password [____]

[ Login ]  [ Cancel ]

*Fig. 5*

ABC Electric    Menu Screen

[ Company Profile ]

[ Product Introduction ]

[ Submit Question ]

[ Request Switching ]

[ Change Priority Level ]

*Fig. 6*

| Question Input Screen |
|---|

Membership No.   123456
Full Name        Taro Fujitsu
Question in full:

Current Points:     25
Priority Level:  High● Low○  5

OK   Cancel

*Fig. 7*

| Question Acceptance Completion Alert |
|---|
| The item below has been accepted for discussion.<br>Call No. 024<br>Number of persons currently waiting:16<br><br>Membership No.  123456<br>Full name:       Taro Fujitsu<br>Discussion content:<br>  Are A Corp.'s and B Corp.'s products interconnectable?<br>Priority Level:  High    5 |

*Fig. 8*

Switching Request Screen

Call No. 024
Number of persons currently waiting: 14

Membership No.    123456
Full Name         Taro Fujitsu
Discussion content:
  Are A Corp.'s and B Corp.'s products interconnectable?

Current Points:    25

Priority Level: High ● Low ○   [5 ▲▼]

[ Request Switching ]    [ Cancel ]

*Fig. 9*

From: ABC Electric's Help D sk
Subject: Request to Switch Places in Line for Response Your place (for Call No. 018) in the response line is currently 9th.

A request to switch places in line has just reached us, in an urgent matter from a customer whose place in the response line is behind yours.

If you are able to meet this request, your place in the response line will go to 14th, but you will win 5 points.

Please register through the following page:
  http://www.abc.com/soudan/henkou.html There are no procedures to go through if you are unable to meet this request.

Sequence-Change Inquiry Screen

Call No. 024
Number of persons currently waiting: 9

Your place in the response line will go to 14th, but you will win 5 points.
Switch places in line?

| YES | NO |

Fig. 11

From: ABC Electric's Help Desk

Subject: Request to Switch Plac s in Line for Response

Your place in the response line has been switched.
Call No. 024
Number of persons currently waiting: 9
5 points have been deducted from your point total.

Membership No.    123456
Full Name    Taro Fujitsu
Discussion content:
Are A Corp.'s and B Corp.'s products interconnectable?

Fig. 12

Priority-Level Change Screen

Call No. 024
Number of persons currently waiting: 14

Membership No.    123456
Full Name    Taro Fujitsu
Discussion content:
  Are A Corp.'s and B Corp.'s products interconnectable?

Current Points: 25
Priority Level: High ● Low ○   10 ▲▼

[ Change ]  [ Cancel ]

Fig. 13

```
Priority Level Change Alert
```
The priority level for Call No. 024 has been changed to 10.
Number of persons currently waiting: 14

Membership No.   123456
Full name:        Taro Fujitsu
Discussion content:
  Are A Corp.'s and B Corp.'s products interconnectable?
Priority Level:   High    10

*Fig. 14*

```
Replier Web page
```
Currently, there are 16 discussion items.
Next Question Membership No.   123456
Full Name        Taro Fujitsu
Discussion content:
  Are A Corp.'s and B Corp.'s products interconnectable?
Priority Level:   High    5

[ Reply ]   [ Don't Reply ]

*Fig. 15*

Reply Input Screen

Membership No.  123456
Full Name  Taro Fujitsu
Discussion content:
  Are A Corp.'s and B Corp.'s products interconnectable?
Priority Level:  Low  10

Reply Box

An adapter is available for connecting A Corp. and B Corp. products.
With C Corp.'s product, not B Corp.'s, you can link directly to an A Corp. product.
C Corp. product Points you have gained: 0

Send    Cancel

From: ABC Electric's Help Desk
Subject: Reply for Call No. 024

Reply Content
  An adapter is available for connecting A Corp. and B Corp. products. With C Corp.'s product, not B Corp.'s, you can link directly to an A Corp. product.
  C Corp. product is functionally equivalent to B Corp.'s, and is roughly the same cost.
  I suggest you give this a thought.
  Discussion content:
    Are A Corp.'s and B Corp.'s products interconnectable?

Current points:  21 pts.

Fig. 17

Wait Column

Seq. Order
1    Record A
2    Record B
3    Record C
4    Record D
5    Record E
6    Record F
7    Record G
8    Record H
9    Record I
⋮

```
┌─────────────────────────────────────────┐
│ Question Input Screen                   │
├─────────────────────────────────────────┤
│                                         │
│ Membership No.  123456                  │
│ Full Name      Taro Fujitsu             │
│ Discussion Content:                     │
│   ┌─────────────────────────┐           │
│   │                         │           │
│   │                         │           │
│   └─────────────────────────┘           │
│                                         │
│ □Set reply deadline.                    │
│  ┌──┬─┐                                 │
│  │60│▲▼│ Desired within ---- min.       │
│  └──┴─┘                                 │
│   ┌──────┐   ┌────────┐                 │
│   │  OK  │   │ Cancel │                 │
│   └──────┘   └────────┘                 │
└─────────────────────────────────────────┘
```

*Fig. 20*

```
┌─────────────────────────────────────────────┐
│ Question Acceptance Completion              │
├─────────────────────────────────────────────┤
│ The item below has been accepted for        │
│ discussion.                                 │
│ Call No. 024                                │
│ Number of persons currently waiting:   16   │
│                                             │
│ Membership No.   123456                     │
│ Full name:       Taro Fujitsu               │
│ Discussion content:                         │
│   Are A Corp.'s and B Corp.'s products      │
│   interconnectable?                         │
│                                             │
│ To obtain a reply within 60 min., the       │
│ priority level must be put to 10 or greater.│
│                                             │
│ Current Points: 25                          │
│ Priority Level: High ● Low ○   ┌──┬─┐       │
│                                │10│▲▼│      │
│                                └──┴─┘       │
│        ┌──────────┐   ┌────────┐            │
│        │ Finalize │   │ Cancel │            │
│        └──────────┘   └────────┘            │
└─────────────────────────────────────────────┘
```

*Fig. 21*

Seq. Order | Wait Column 1

1 | Priority level 1

2 | Priority level −3

3 | Priority level 2

4 | Priority level 3

*Fig. 24A*

Seq. Order | Provisional Wait Column 1 | Provisional Wait Column 2

1 | Priority level 1 | Priority level 2

2 | Priority level −3 | Priority level 3

*Fig. 24B*

Seq. Order | Provisional Wait Column 1 | Provisional Wait Column 2 | Provisional Wait Column 3

1 | Priority level 1 | Priority level 2 | Priority level 3

2 | Priority level −3 | |

*Fig. 24C*

CUSTOMER REQUEST MANAGEMENT METHOD, DEVICE AND COMPUTER PRODUCT

BACKGROUND OF THE INVENTION

1. Technical Field

The present invention relates to service-provision sequence-changing methods, to service-provision sequence-changing devices, and to service-provision sequence-changing computer products.

2. Description of the Related Art

In situations in which service providers cannot manage the simultaneous provision of a service to numerous customers, to provide the service some sort of sequence has to be determined. Ordinarily, that sequence is the order in which customers have made service-provision requests at a service-provision portal. For example, in a case in which someone wants to receive provision of deposit-account withdrawal service at a bank service-window, that person may take a numbered ticket dispensed by serial number alongside the service window, and receive provision of the service when the number he or she has taken is called. Or, in a system for transmitting questions and obtaining replies to them over a network, it is made so that when a question is input into a question-input form displayed on a Web browser and the question is transmitted to a server, replies are prepared and transmitted in the date/time order in which the questions are received. In this way provision of services may be accomplished without mixing up customers.

Notwithstanding such sequencing of the provision of services, in certain circumstances a customer may want prioritized service ahead of other customers. A method of responding to a need of this sort may be, to mention one example, making it so that in a situation in which a customer wants to receive the service of a reply to a question, by paying a special fee that customer may receive a prioritized reply ahead of other customers.

The method as described above of prioritizing, based on payment of a special fee, the sequence in which the provision of services is received means that someone who has paid the fee is served ahead of someone who has not. Nevertheless, with several persons having paid the special fee none can be put ahead of the others; and among customers who have alike paid the special fee in the same amount, providing prioritized service to a particular person is more than likely to leave the other customers with a sense of unfairness.

BRIEF SUMMARY OF THE INVENTION

An object of the present invention is to provide a method of changing the sequence in which service is provided without leaving customers with a sense of unfairness.

In a first aspect of the present invention, a method for altering sequence in which a service is provided includes a service-request acceptance step, a first storing step, a sequence-alteration step of altering, and an updating step. The service-request acceptance step sequentially accepts service requests each being a request for receiving a predetermined service, and accepts designation of priority levels for receiving the service on a priority basis. The first storing step stores one or more wait queues each containing a plurality of wait records that each include a priority level, an identifier for a service requester being someone who makes the service request, and the sequential order in which the service request has been accepted. The sequence-alteration step alters, according to the priority levels and to points that each the service requester has, the sequential order of the wait records. The updating step updates the points for those service requesters whose sequential order has been altered.

In this aspect, service requests and priority-level designations are accepted. "Priority levels" are, for example, the dual values "high" or "low," or arbitrary integers such as "+3" and "−2." A wait queue containing wait records including identifiers for service requesters who make service requests, priority levels, and sequential orders in which the service requests are accepted, is stored in memory. The sequence of the wait records is altered in accordance with the designated priority level and points that the service requesters own. For example, the sequential order for a service requester who has "5" in points and whose priority level is designated "high" could be switched to a maximum 5 ranks higher. Alternatively, the sequential order for a service requester whose priority level is designated "low" could be switched so as to be put in a lower rank in the wait queue. Exchangeable for some equivalent value or other, "points" herein are numerical values awarded to service requesters. The awarding of points may be by, for example, granting identical points to all the service requesters when a first request is made, or by awarding an amount of points according to a points purchasing charge that a service requester pays. The points may be stored for example in a storage medium separate from the storage medium in which the wait records are stored, e.g., a DRAM or the like in a POS terminal, POS host or the like, where the points for a service requester for whom the wait-record sequential order has been switched are updated.

If for instance the sequential order of a wait record has been switched to three ranks higher, the points are updated by deducting 3 points from that service requester. Alternatively, for a service requester whose sequential order has been switched to a lower rank consequent on a certain service requester's sequential order being switched to a higher rank, if for example the sequential order has been switched to 1 rank down, the points could be updated by adding 1 point. The awarding of points may be rendered so that points are not added in a situation in which it is recognized that a service requester has in mind the end of merely winning points.

Thus in this aspect of the invention, the sequential order of a wait record can be switched to a higher rank in accordance with priority-level designation, which enables responding to the needs of someone who is in a rush for service provision. Inasmuch as in that instance the points of the service requester are altered, alterations to the sequence may be made without a sense of unfairness arising among the service requesters.

A service-provision sequence-altering method in a second aspect of the invention is that as set forth in describing the first aspect, but further including a grouping step of grouping the wait records; wherein the sequence-alteration step interchanges, according to the priority levels and the points, the sequential orders of wait records belonging to different groups.

Herein the wait records are grouped. Grouping is done for example by putting every three wait records in order from higher-ranking into a first group, second group, . . . etc. Then in the sequence-alteration step, the sequential orders of wait records belonging to different groups are interchanged according to priority level and points.

The fact that in this way the sequential orders of wait records belonging to different groups are interchanged makes possible preventing, even if a wait record whose priority level is high persists, the problem of provision of a service for a wait record in a lower rank not taking place no matter how long a time has elapsed.

A third aspect of the present invention is the service-provision sequence-altering method set forth in either of the foregoing aspects, but wherein the sequence-alteration step is conducted every predetermined time interval.

In this aspect of the invention the sequence-alteration step is conducted every predetermined time interval; rendering the method this way means that the sequence of the wait records is altered with every elapse of a predetermined time interval.

A service-provision sequence-altering method according to a fourth aspect is that as set forth in the foregoing first or second aspects, further including a sequence-alteration-request-acceptance step, a specifying step, an inquiry step, and a consent-acceptance step, wherein the aforementioned alteration step interchanges sequential orders in response to consent. The sequence-alteration-request-acceptance step accepts a request to change sequential order of the wait records. The specifying step specifies a wait record the sequential order of which will be interchanged, according to the priority level and to points held by a sequence-alteration-requester being the requester of the request to change sequential order, with a wait record for the sequence-alteration-requester. The inquiry step inquires as to whether or not the service requester for the specified wait record consents to the interchanging of sequential orders. The consent-acceptance accepts consent as granted by the service requester in the inquiry step.

In this aspect, a request to change sequential order is accepted by means of a request-input screen or the like, displayed in a Web browser. A wait record that forms the target of a sequential-order interchange is specified according to points that a sequence-change requester holds and designated priority level. For example, in a case in which a sequence-change requester has designated the priority level "high," and the points her or she holds are 5, the wait record would be specified as a target for interchanging 5 ranks higher. In this respect the invention may be rendered such that the sequence-change requester may designate within the range of the points held points to be used for interchanging wait records. If for example the held points are 5, this could be a designation indicating that up to a maximum 3 may be used as points required for interchanging. The inquiry as to whether or not the service requester whose wait records has been specified consents to interchanging sequential orders may be made by e-mail. Consent to interchanging is accepted for example through a consenting screen displayed in a Web browse. When consent has been accepted, the sequential order of the wait record for the service requester who has granted consent, and of the wait record of the sequence-change requester, are interchanged.

In this way, the sequence in which a service is provided may be altered according to the wills of the parties concerned.

A service-provision sequence-altering method in a fifth aspect of the present invention is that as set forth in any of the foregoing aspects, while further including a time-interval designating step and a calculation step. The time-interval designating step accepts designation of deadline for the service, the deadline being a period of time until provision of the service is received. The calculation step calculates and outputs points and/or priority level required to obtain the service by the service deadline.

In this aspect, when a service deadline is designated, estimated values for the points and priority level required by the deadline are calculated. The calculation may be reckoned from, for example:

coefficient×[(average wait time per person×no. of wait records)−(service deadline)]/(average wait time per person×points required to go up 1 place in sequence)

The coefficient herein should be greater than 1, because elevating the sequential order for a given wait record to a higher-ranking wait record is difficult if numerous wait records whose priority level is high are present. In particular, the coefficient is determined empirically based on points and priority levels that have been necessary in order that provision of a service be performed within a designated time limit for the service.

Whether or not a service can be received within a time period herein designated according to points owned and priority level can in this way be checked through the calculation results.

A sixth aspect is a service-provision sequence-altering method as described above, but further including a point-storing step of storing points each service requester owns.

In this aspect, points that each service requester has are stored. The points may be stored in a storage medium such as the computer RAM or hard disk in which wait records are stored, but may be stored in a computer separate from the storage medium in which the wait records are stored—for example, in a POS terminal, POS host or the like. In this case, access would be made from a computer in which the wait records are stored via a network or like connection to a POS terminal, and the points that service requesters have would be stored in the POS terminal. In an instance in which a service requester purchases a given product or service, the sale would then be made discounting the merchandise cost through the POS terminal according to the points stored. Rendering the method in this way by storing points that the service requesters own makes it possible to grant the service requesters exchange value for their points.

In a seventh aspect the invention is a service-provision sequence-altering method as set forth in any of the foregoing aspects, yet further including a distribution step of distributing the wait records into a plurality of the wait queues; and a second storing step of storing the plurality of wait queues.

In this aspect of the invention, the wait records are distributed into a plurality of wait queues. The distribution is carried out for example by extracting wait records in a given wait queue in descending order from a wait record at a higher-ranking sequential order such that the extracted weight records will number approximately the same as the total count of wait records that are to be distributed into the wait queues, and apportioning to each wait queue. The plurality of wait queues is then stored. Storage of the plurality of wait queues is carried out for example by creating for each of the wait queues a table storing the distributed wait records. In this case, the sequence-alteration step can be performed using the wait queues.

Thus, a plurality of service-provision portals, each of which is for a respective one of the wait queues, may be furnished herein, whereby services may be provided, and service provision carried out promptly. In addition, a service provider can recover points from a service requester whose wait record in terms of sequential order has been raised by the distribution step to a ranking higher than its former sequential place. From a service requester whose wait-record sequential order has been raised three ranks higher in the distribution step for example, a service provider might recover 3 points. Rendering the present method such that a service provider may accumulate these points and exchange them for other consideration enables for example allotting expenditures wherein more service-provision portals have been set up. And altering the sequence can serve to hasten the provision of services, without leaving service requesters with a sense of unfairness.

In an eighth aspect the present invention is a service-provision sequence-altering method as set forth in any of the foregoing aspects, yet also including a restriction step of restricting the number of times the sequence-alteration step is executed with respect to each wait record.

The inventive method in this aspect restricts the number of times the sequence-alteration step is executed with respect to each wait record. Restricting this execution count might be, for example, by flagging with a "sequence-switching done" flag a wait record for which the sequential order has once been altered in the sequence-alteration step, to make it so that the sequence-alteration step is not performed on the wait record flagged with this flag until a predetermined time period, e.g. 1 hour, has elapsed. Rendering the present method in this way makes it so that interchange of sequential orders will not occur twice or more within a predetermined time period, and makes for preventing a situation in which, on account of the sequential order being switched extremely frequently, a sequentially lower-placed service requester is not able to receive provision of a service no matter how much time has elapsed.

A device for altering sequence in which a service is provided is a ninth aspect of the invention, and comprises service-request acceptance means, first storing means, sequence-alteration means, and updating means. The service-request acceptance means sequentially accepts service requests each being a request for receiving a predetermined service, and designation of priority levels for receiving the service on a priority basis. The first storing means stores one or more wait queues each containing a plurality of wait records that each include a priority level, an identifier for a service requester being someone who makes the service request, and the sequential order in which the service request has been accepted. The sequence-alteration means alters, according to the priority levels and to points that each the service requester has, the sequential order of the wait records. The updating means updates the points for those service requesters whose sequential order has been altered.

A tenth aspect of the present invention is a service-provision sequence-altering computer product for causing a computer to function as service-request acceptance means, first storing means, sequence-alteration means, and updating means. The service-request acceptance means sequentially accepts service requests each being a request for receiving a predetermined service, and designation of priority levels for receiving the service on a priority basis. The first storing means stores one or more wait queues each containing a plurality of wait records that each include a priority level, an identifier for a service requester being someone who makes the service request, and the sequential order in which the service request has been accepted. The sequence-alteration means alters, according to the priority levels and to points that each the service requester has, the sequential order of the wait records. The updating means updates the points for those service requesters whose sequential order has been altered.

Utilizing the present invention makes it possible to alter, without leaving customers with a sense of unfairness, the sequence in which service are provided.

From the following detailed description in conjunction with the accompanying drawings, the foregoing and other objects, features, aspects and advantages of the present invention will become readily apparent to those skilled in the art.

BRIEF DESCRIPTION OF SEVERAL VIEWS OF THE DRAWINGS

FIG. 2 is a conceptual explanatory diagram of information stored in a question DB;
FIG. 5 is an example of a login screen;
FIG. 6 is an example of a menu screen;
FIG. 7 is an example of a question-input screen;
FIG. 8 is an example of a question-acceptance completion alert;
FIG. 9 is an example of a switching demand screen;
FIG. 10 is an example of an e-mail inquiring about switching that is desired;
FIG. 11 is an example of screen inquiring about altering a sequence;
FIG. 12 is an example of a sequence-alteration alert;
FIG. 13 is an example of a screen for switching priority levels;
FIG. 14 is an example of a priority-level switching alert;
FIG. 15 is an example of a replier webpage;
FIG. 17 is an example of a reply e-mail;
FIG. 20 is an example of a question-input screen;
FIG. 21 is an example of a question-acceptance completion screen;
FIG. 24 is examples of a current wait queue and of provisional wait queues.

DETAILED DESCRIPTION OF THE INVENTION

FIRST EMBODIMENT

Configuration

Figure 1:
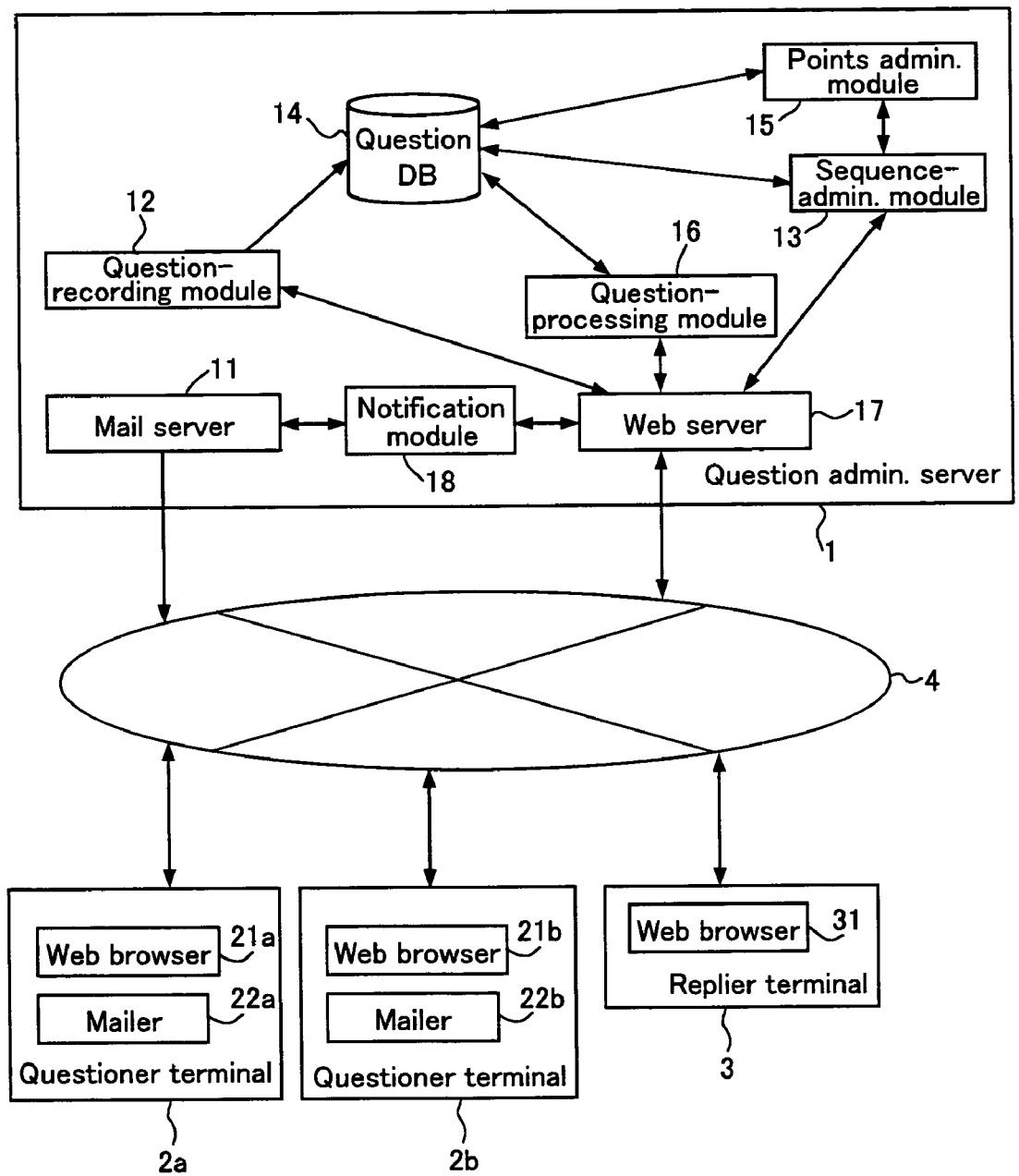
FIG. 1 is an overall configurational view of a question-acceptance system having to do with a first embodiment.

FIG. 1 is an overall configurational view of a question-acceptance system having to do with a first embodiment of the present invention. The system is a question administration server 1, questioner terminals 2*a, b* (referred to as "questioner terminals 2" hereinafter), and replier terminal 3, connected over a network 4, which may be the Internet or another network such as an intranet.

The question administration server 1 includes a mail server 11, a question-registering module 12, a sequence-administration module 13, a question database (DB) 14, a points administration module 15, a question-processing module 16, a Web server 17, and a notification module 18. The mail server 11 is for example a publicly known SMTP (simple mail-transfer protocol) server, and transmits electronic mail containing the content shown by way of example in FIGS. 8, 10, 12, 14 and 17 to the questioner terminals 2. The notification module 18 instructs the mail sever 11 to transmit e-mail to the questioner terminals 2. The question-registering module 12 offers the question-input screen shown exemplarily in FIG. 7 to the questioner terminals 2, accepts input of questions, groups inputted questions and registers them in the question DB 14. Grouping by the question-registering module 12 will be described later. Furthermore, when the "Change Priority Level" button on the menu screen shown by way of example in FIG. 6 is clicked, the question-registering module 12 offers the priority-level switching screen shown exemplarily in FIG. 13 to the questioner terminals 2. When on this screen a priority level is designated and a "Change" button is clicked, the question-registering module 12 accepts a priority-level change with regard to a question that has already been input. A count of persons currently waiting may be displayed in real time on the priority-level switching screen. Utilizing this screen, a questioner may confirm that the sequence of an already registered question has been moved up, or check to what extent questions as a whole have backlogged. Moreover, the priority level of an already registered question can be changed as needed. Once the question-registering module 12 has accepted a change in priority level, it transmits an e-mail containing the content represented in FIG. 14, which is a switched-priority-level alert, to the questioner terminals 2. The question DB 14 stores the questions. In response to input into the switching demand screen, as well as to the sequence-switching inquiry screen shown by way of example in FIGS. 9 and 11 respectively, or by means of a later-described sequence-altering process, the sequence-administration module 13 switches the sequence for replying to the questions stored in the question DB 14.

The points administration module 15 makes a predetermined point adjustment in respect of a questioner for whom the sequence for replying has been switched, and orders the mail server 11 to report the subject matter of the point adjustment, shown exemplarily in FIGS. 10 and 12. "Points" herein are numerical values that are exchangeable for given awards—such as the discounting a predetermined percentage of the charge in purchasing certain merchandise—if person has a predetermined number of points. Exchanging points for awards is carried out by connecting a not-illustrated POS system at a merchandise dealer's with the point administration module 15 over a LAN or the like, registering/updating questioner by questioner in a not-illustrated POS host merchandise discount rates in accordance with the questioners' current points, and when one of the questioners purchases merchandise at a merchandise sales store, making the sale by discounting at a POS terminal the registered discount percentage from the merchandise cost. It will be appreciated that to make up for selling the merchandise at discounted cost, if for example the administrator of the question administration server 1 is at the same time the merchandise manufacturer, the merchandise manufacturer when settling accounts with the merchandise seller for the merchandise stocked could deduct the total discounted cost from the stock-purchasing charge.

The question-processing module 16 presents in order questions registered in the question DB 14 to the replier terminal 3, and requests input of a reply. In response to a request by the questioner terminals 2 or the replier terminal 3, the Web server 17 transmits the Web pages shown by way of example in FIGS. 5, 6, 7, 9, 11, 13, 15 and 16.

The questioner terminals 2 include a Web browser 21 and a mailer 22. The Web browser 21 requests of the Web server 17 transmission of, and displays, the Web pages illustrated in FIGS. 5, 6, 7, 9, 11 and 13, and as needed transmits to the Web server 17 information and commands input into these Web pages. The mailer 22 receives and displays e-mail transmitted from the mail server 11.

The replier terminal 3 includes a Web browser 31. The Web browser 31 requests of the Web server 17 transmission of, and displays, the Web pages illustrated in FIGS. 15 and 16, and as needed transmits to the Web server 17 information and commands input into these Web pages.

Figures 18A, 18B:
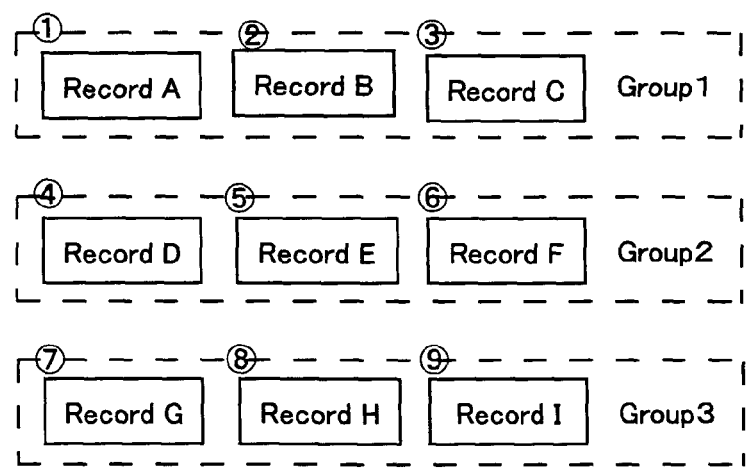
FIG. 18 is examples of grouping wait queues.

FIG. 2 is a conceptual explanatory diagram showing in table form data stored in the question DB 14. The question DB 14 includes "Sequence," "Datetime received," "Questioner," "Question content," "Current points," "Priority level," "Sequence switching" and "Group" fields. "Sequence" indicates the succession order in which a reply to a question is prepared. "Datetime received" is the date and time a question is accepted. "Questioner" is the full name of a person who has made a question. Herein it is presumed that the full names of the questioners in the question DB 14 are each unique, but identifiers such as questioner ID numbers may be stored with the questioners. "Question content" indicates the subject matter of a question. "Current points" are the points that a questioner holds at present. "Priority level" is designated by a questioner when transmitting a question. Priority level herein being positive indicates promotion to a higher ranking, while priority level being negative indicates that demotion to a lower ranking is possible. "Sequence switching" is a flag indicating whether or not the sequence has been changed through a later-described sequence-changing process, with "done" if the sequence has been switched, and "not done" if the sequence has not been switched, respectively being stored. "Group" indicates the group to which each record stored in the question DB 14 belongs. In the "Group" field in this case 1, 2, . . . have been assigned in turn to the records whose sequences are 1-3, 4-6, . . . , and stored. For example, waiting rows made up of records A, B, C, D, E, F, . . . shown by way of example in FIG. 18(*a*) are grouped in an order of triplets of higher-ranking records. This means that, as exemplified in FIG. 18(*b*), records A, B and C belong to Group 1; records D, E and F to Group 2; . . . etc.

Process Flow (1) Process Flow in the System Overall

Figure 3:
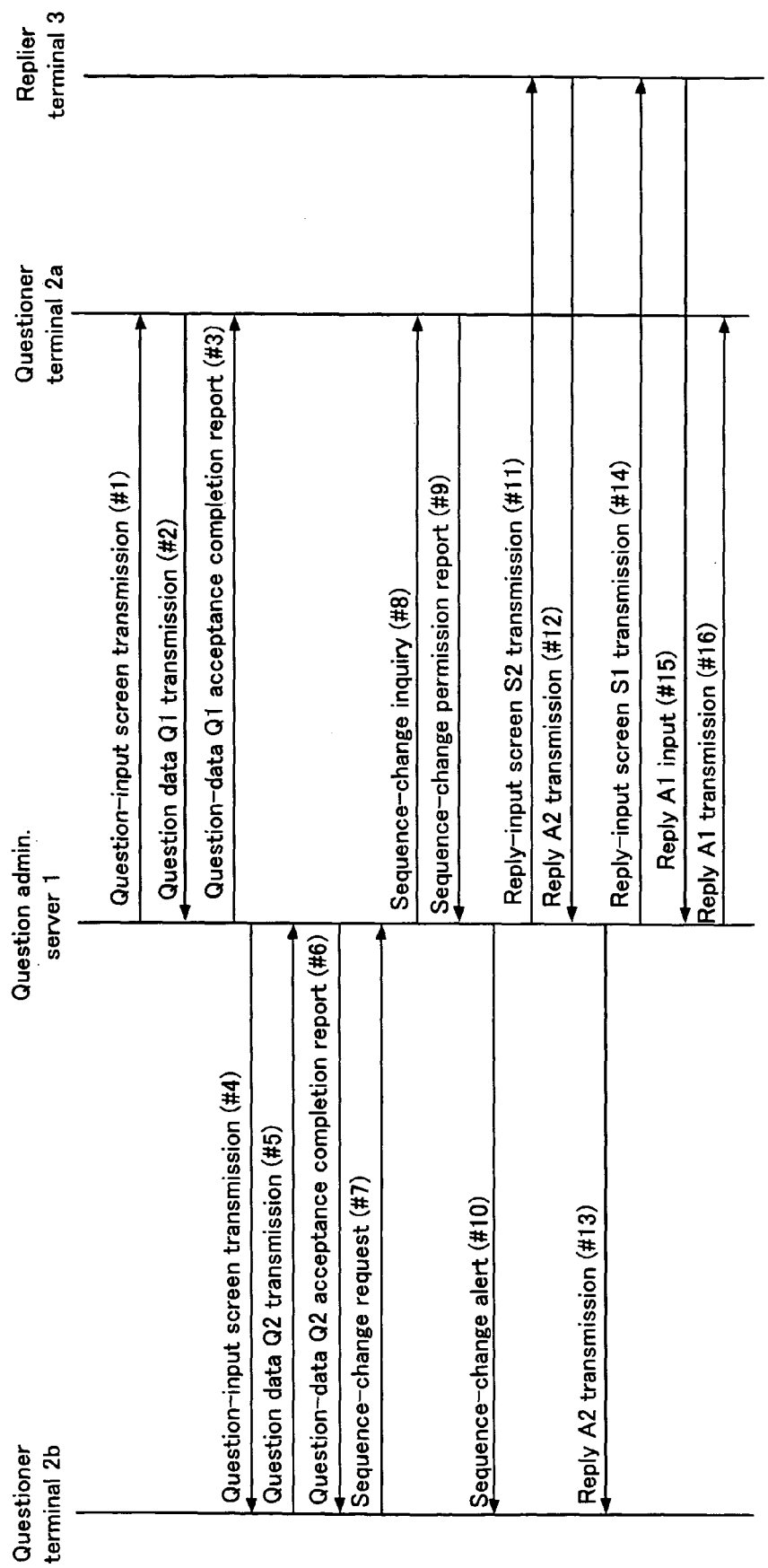
FIG. 3 is a chart of process flow in the system overall.

Next, processes carried out in the question administration server 1 will be outlined with reference to FIGS. 3 through 17. FIG. 3 is an outline diagram representing process flow in the present system overall. In this system questions inputted through the questioner terminals 2 are transmitted via the question administration server 1 to the replier terminal 3, where replies are input. Inputted replies are then transmitted via the question administration server 1 to the questioner terminals 2.

At first a question-input screen is transmitted from the question administration server 1 to the questioner terminals 2 (#1). Transmission of the question-input screen is for example carried out as follows. Initially a login screen as represented in FIG. 5 is displayed on a Web browser 21*a* on questioner terminal 2*a*, and the inputting of a membership number and password into this screen displays a menu screen as exemplified in FIG. 6. Then by an "Input Question" button being clicked on, the question-input screen shown by way of example in FIG. 7 is transmitted to questioner terminal 2*a* (#1).

The text of a question is input into the "Question content" textbox on this question-input screen. Priority level is then designated through selection by pressing down either a "High" or "Low" radio button, as well as by scrolling through numerical values in a list box. Through this screen a numerical value less than the current points that a questioner has can be designated as the priority level. Designating a priority level n (where n is an arbitrary integer) in this case switches the record, as will be described later, by promoting or demoting it n places in the sequence, and at the same time adds −n points to the questioner, but the numerical value of points added as a consequence of changing the sequence may be rendered other than as just noted. The questioner utilizing questioner terminal 2a to place questions is thus designated a negative priority. When a question and a priority level are input and an "OK" button pressed, question data Q1 containing the question content, priority level, membership number, and other information is transmitted to the question administration server 1 (#2). The transmitted question data Q1 is registered given the lowest-ranking sequential order and group in the question DB 14. When the question data Q1 is registered, the mail server 11 transmits to questioner terminal 2a a question-acceptance completion alert, which is an e-mail making notification to the effect that the question has been accepted (#3).

Likewise, the login screen shown exemplarily in FIG. 5 is displayed on a Web browser 21b on questioner terminal 2b, and the inputting of a membership number and password into this screen displays the menu screen of FIG. 6. Then by an "Input Question" button being clicked on, the question-input screen exemplarily shown in FIG. 7 is transmitted to questioner terminal 2b (#4). In the same way as noted above, when a question and a priority level are input and an "OK" button pressed, question data Q2 containing the question content, priority level, membership number, and other information is transmitted to the question administration server 1 (#5). The transmitted question data Q2 is registered given the lowest-ranking sequential order and group in the question DB 14, but comes after question data Q1 in the sequence. When the question data Q2 is registered in the question DB 14, the mail server 11 transmits to questioner terminal 2a a question-acceptance completion alert, which is an e-mail containing the subject matter shown by way of example in FIG. 8 (#6).

When a "Request Switching" button on the menu screen exemplified in FIG. 6 is clicked, the switching demand screen shown by way of example in FIG. 9 is displayed. By priority level being selected with a priority-level radio button and a list box in the lower portion of the screen, and the "Request Switching" button being clicked, a sequence-change demand for switching to a higher rank the sequential order of the question data Q2 in the question DB 14 is transmitted from questioner terminal 2b to the question administration server 1 (#7). Herein, a numerical value less than the current points displayed can be designated as the priority level. Thus, a questioner, utilizing questioner terminal 2b to place questions, who instead of being awarded 5 points wants the 14$^{th}$ place that is the current sequential order to be switched up to 9$^{th}$ place would designate "5" in priority level "high." When the question administration server 1 receives the sequence-change request, it inquires with questioner terminal 2a as to changing sequential order according to the priority levels of question data Q1 and question data Q2 (#8). The inquiry is carried out for example by an e-mail, whose substance is for example as shown in FIG. 10, being transmitted to questioner terminal 2a.

In this e-mail, for example, a hyperlink is embedded; and when the hyperlink is clicked the screen shown exemplarily in FIG. 11 is transmitted from the Web server 17 and displayed by Web browser 21a. When a "Yes" button on this screen is clicked, a notice indicating that a sequence change will be permitted is transmitted to the question administration server 1 (#9). Having received this notice, the question administration server 1 changes the record sequence by interchanging, in the question DB 14, the sequential order of the record containing question data Q1 and the record containing question data Q2, and makes a report to the question terminal 2b, indicating that the sequence has been changed (#10). This report is made by transmitting an e-mail reciting subject matter shown exemplarily in FIG. 12. It should be understood that while the question sequence may, omitting the processes mentioned above in #7 through #10, be altered simply by a later-described sequence-altering process, the processes in #7 through #10 let the sequential order, depending on bargaining among the questioners, of a lower-ranking question be raised to a higher rank in one go, and the reply is immediately available to the questioner.

Figure 16:
FIG. 16 is an example of a reply input screen.

The question administration server 1 transmits a reply input screen S2 to the replier terminal 3 (#11). This screen is transmitted when a "Reply" button on a replier webpage (WP), such as is shown exemplarily in FIG. 15, displayed by the Web browser 31 on the replier terminal 3 is clicked. The substance of the question contained in the question data Q2 to which the replier should respond to next is displayed on the replier WP. FIG. 16 is an example of a replier input screen. The substance of the question contained in the question data Q2 is displayed in the upper portion of this screen. A reply A2 to the question subject matter may be input into a "Reply box" in the lower portion of the screen. Points summed to the questioner's current points may be designated in "Points gained this time," also in the lower portion of the screen. Herein, "Points gained this time"—which is for a reply that is to a question whose sequential order has been raised by sequence interchange—are designated "0." When a "Send" button is pressed the reply input screen S2 closes and the replier webpage is returned to; and reply A2 is transmitted to the question administration server 1 (#12). The subject matter of the question contained in question data Q1 that is next due a reply is shown on the again-displayed replier webpage. The question administration server 1 transmits reply A2 to questioner terminal 2b (#13). Transmission of reply A2 is carried out by, for example, sending an e-mail reciting the subject matter shown exemplarily in FIG. 17.

When next a "Yes" button on the replier webpage is clicked once more, a reply input screen S1 in the manner of FIG. 16 is transmitted to the replier terminal 3 (#14). The substance of the question contained in question data Q1 that is next due a reply is displayed in the upper portion of this reply input screen S1, which differs from reply input screen S2. A reply A1 to the question subject matter in question data Q1 is input into a "Reply box" in the lower portion of the screen. Discretionary points summed to the questioner's current points may be designated in "Points gained this time," also in the lower portion of the screen. The designated points are summed to the questioner's current points by the points administration module 15. Assigning as the "Points gained this time" a positive integer herein to a reply that is to a question whose sequential order has been lowered by sequence interchange means such that a questioner who has forfeited a sequential order is awarded additional points, which lets the sequence-altering process take place without a sense of unfairness arising among the questioners. The fact that the designation of points is discretionary, furthermore, enables designating 0 or a relatively small positive integer as the "Points gained this time," and enables making it so that points are not given to a questioner who, just after having gone through with a question consents to changes in the sequence order of the question, with the objective of merely getting points. Accordingly, despite there being a possibility of problems arising in that only with the goal of acquiring points questions will be placed in order that points be added with respect to a question for which the question sequence order has been shifted down in ranking by the later-described sequence-altering process, preventing problems of this sort is possible utilizing the reply input screen in FIG. 16 not to give points to such a questioner.

When the "Send" button is then pressed the reply input screen S1 closes and the replier webpage is returned to; and reply A1 is transmitted to the question administration server 1 (#15). The question that comes next in sequence after question data Q1 in the question DB 14 is shown on the again-displayed replier webpage. The question administration server 1 transmits reply A1 to questioner terminal 2a (#16). Transmission of reply A1 is carried out by, for example, sending an e-mail.

A plurality of replier terminals 3 may be provided and the embodiment rendered so that the question that is the highest-ranking among questions registered sequentially in the question DB 14 is answered through one of the replier terminals 3 that has finished a reply. In this way, likewise as with service at bank teller windows, even with a plurality of replier terminals 3 a reply can be received first from the questioner for whom the sequence order in the sequence in the question DB 14 is highest-ranked.

(2) Process Flow in the Question Administration Server

Figure 4:
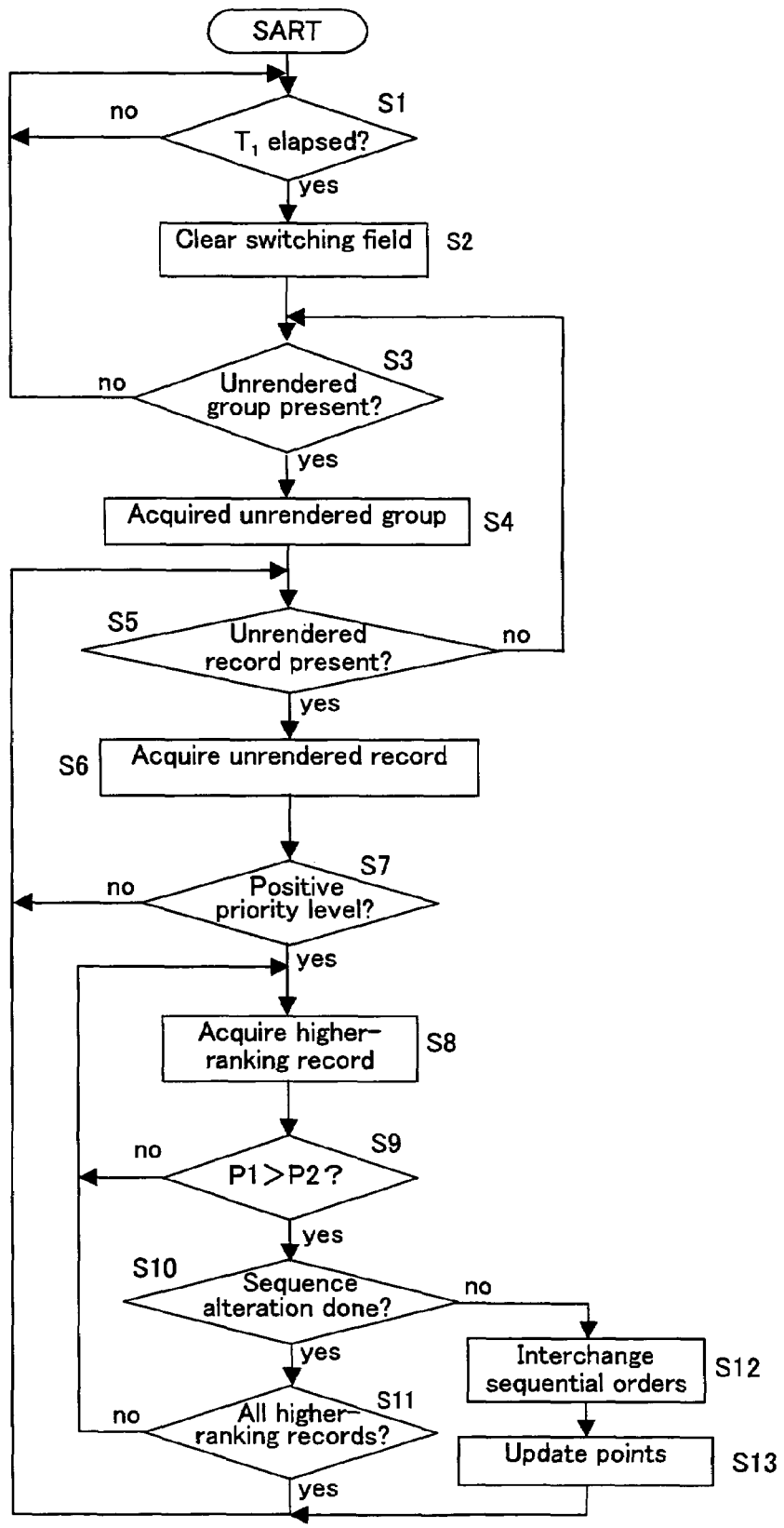
FIG. 4 is a flowchart of a sequence-altering process.

Next, flow of a sequence-altering process carried out in the question administration server 1 will be explained. FIG. 4 is a flowchart representing flow of the sequence-altering process. At predetermined time intervals, the sequential order of a record whose priority level is high is by this process interchanged with the sequential order of one whose priority level is low, among records belonging to a group that differs from that of the high-priority-level record. This process is carried out by the sequence-administration module 13.

Step S1: The sequence-administration module 13 judges whether or not a given time $t_1$, e.g., 1 hour, has elapsed. If it has elapsed, step 2 ensues. If it has not elapsed, the aforementioned judgment is repeated until $t_1$ elapses.

Step S2: The sequence-administration module 13 sets the "Sequence switching" fields in all the records in the question DB 14 to "not yet."

Step S3: The sequence-administration module 13 judges whether or not a group whose sequential order has not been compared for switching (referred to as an "unrendered group" hereinafter) is present. An unrendered group herein is a group for which all the Sequence-switching fields in all of the records belonging to that group are put "not yet." If an unrendered group is present, step S4 ensues. If an unrendered group is not present, the process flow goes back to step S1.

Step S4: The sequence-administration module 13 acquires, with a DRAM or the like (not shown in the figures) that the question administration server 1 includes, all the records belonging to the highest-ranking unrendered group.

Step S5: The sequence-administration module 13 judges whether among the records acquired in step S4 there are any records whose sequential order has not been compared for switching (referred to as "unrendered records" hereinafter). An unrendered record herein is a record whose Sequence-switching field in the record is "not yet." If an unrendered record is present, step S6 ensues. If an unrendered record is not present, the process flow goes back to step S3.

Step S6: With the not-illustrated DRAM or the like that the question administration server 1 includes, the sequence-administration module 13 acquires a single unrendered record from the question DB 14.

Step S7: The sequence-administration module 13 judges whether or not the priority level of the unrendered record acquired in step S6 is a positive numerical value. Step S8 ensues if the priority level is positive. If the priority level is not positive, the process flow goes back to step S5.

Step S8: The sequence-administration module 13 acquires a single record (referred to as a "higher-ranking record" hereinafter) belonging to a group (referred to as a "higher-ranking group" hereinafter) whose "Group"-field numerical value is smaller than that of the group acquired in step S4.

Step S9: The sequence-administration module 13 judges whether or not for the unrendered record the priority level P1>priority level P2 for the high-ranking record. If P1>P2, step S1 ensues. If P1≦P2, the process flow goes back to step S8 and a record that has not yet been acquired among those contained in the higher-ranking group is acquired as the higher-ranking record.

Step S10: The sequence-administration module 13 judges whether or not the Sequence-switching field in the high-ranking record is "done." If it is "done," step S11 ensues. If it is not "done," step S12 ensues.

Step S11: The sequence-administration module 13 judges whether or not steps S8 through S10 have been carried out for all the high-ranking records. If so, the process flow goes back to step S5. If not, the process flow goes back to step S8, and steps S8 through S10 are carried out with respect to a higher-ranking record for which the steps have not yet been performed.

Step S12: The sequence-administration module 13 interchanges the sequential order and grouping of the unrendered record and the higher-ranking record, and sets the Sequence-switching field for the unrendered record and for the higher-ranking record to "done." It will be appreciated that providing the Sequence-switching field makes it so that the sequential-order interchange does not occur twice or more within the predetermined time period $t_1$, and that frequently interchanging sequential order makes it possible to prevent a situation in which a question whose priority level is relatively low cannot receive a reply no matter how long a time has passed.

Step S13: The sequence-administration module 13 reduces by a predetermined number, e.g. 1 point, the current points for the record that has been shifted to a higher ranking. It next increases by a predetermined number, e.g. 1 point, the current points for the record that has been shifted to a lower ranking. The process flow then goes back to step S5, and with respect to a higher-ranking record for which the processes of steps S5 through S13 have not yet been carried out, the processes of steps S5 through S13 are executed.

The fact that processes #7 through #10 in FIG. 3, and the sequence-altering process in FIG. 3, interchange the sequential order of a record whose priority level is high with the sequential order of a record present in a higher rank in the question DB 14, either every predetermined time interval or in response to a questioner's request, means that a reply can be obtained ahead of others by setting the priority level higher using the question-input screen in FIG. 7 or the priority-level switching screen in FIG. 13. On the other hand, the fact that points are added in a case in which a sequential order for a reply has been forfeited to another question means that someone who has placed a question that relatively speaking does not require immediate attention may win points for surrendering his or her place in the sequence to someone else. The points gained could be exchanged for any of a variety of premiums such as merchandise discounts, using a POS system or a credit-card account payment system connected with the present system. Likewise, the fact that, as illustrated in FIGS. 7, 9 and 13, the priority level may be designated a value at one's discretion according to the number of points one holds means that the breadth over which sequential orders are switched may be made bigger or smaller. It should be understood that even if the "Group" field is not present in the question DB 14, the sequential order of a reply may be determined by the value of the "Sequence" field, and switching sequential order is possible without comparing sets of questions between groups as in step S8 described above, simply by comparing individual questions. Nevertheless, in a situation in which a question having a high priority level remains continuously in the question DB 14, a problem would arise in that a reply to a lower-ranking question would never be gotten no matter how much time passes. Accordingly, this sort of problem can be, and preferably is, prevented thanks to interchange of sequential orders between groups taking place when priority levels for sets of questions are compared between groups.

SECOND EMBODIMENT

Figure 19:
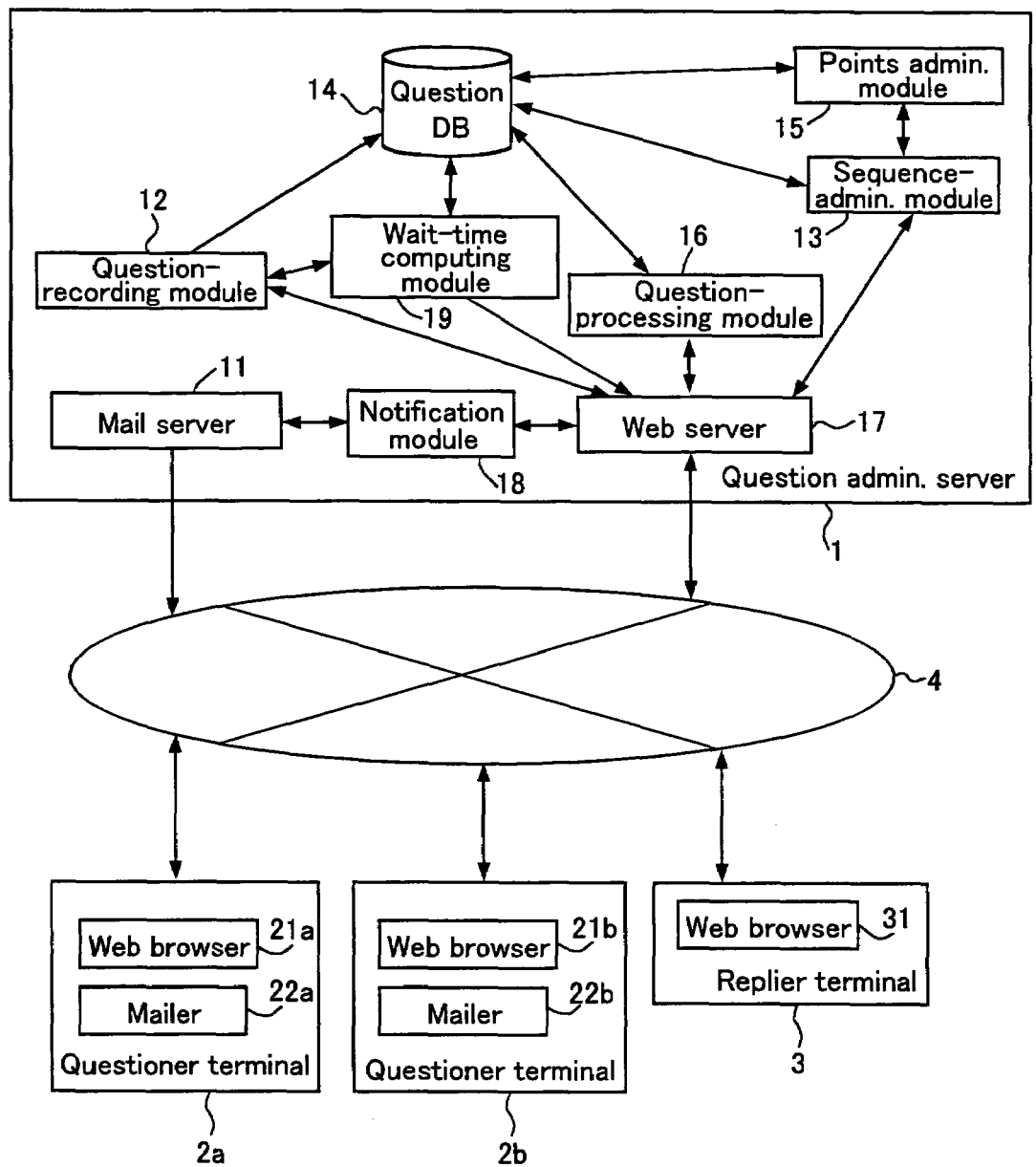
FIG. 19 is an overall configurational view of a question-acceptance system having to do with a second embodiment.

FIG. 19 is an overall configurational view of a question-acceptance system having to do with a second embodiment. This system, likewise as with the question-acceptance system pertaining to the first embodiment of the present invention, is the question administration server 1, questioner terminals 2, and replier terminal 3, connected via the network 4. The configuration and functions of the replier terminal 3 and network 4 are the same as with the first embodiment. The question administration server 1, like the question administration server 1 in connection with the first embodiment, includes the mail server 11, the question-registering module 12, the sequence-administration module 13, the question DB 14, the points administration module 15, the question-processing module 16, the Web server 17, and the notification module 18. It then further includes a wait-time computing module 19. The functions of the mail server 11, question-registering module 12, sequence-administration module 13, question DB 14, points administration module 15, question-processing module 16, Web server 17, and notification module 18 are likewise as with the first embodiment.

In a situation in which having the replier terminal 3 finish within a predetermined period of time preparing and transmitting a reply to a question from the questioner terminals 2 is desired, the wait-time computing module 19 computes the points that this would require and transmits the computed results to the Web server 17. An illustration of an operation realized by the wait-time computing module 19 is set forth below. For example, a question-input screen as depicted in FIG. 20, instead of that as in FIG. 7 in the first embodiment, is displayed by the Web browser 21. Likewise as with the question-input screen in FIG. 7, a textbox into which the body of a question is input appears in the upper portion of this screen. Then a "Designate reply deadline" checkbox and a list box for selecting a reply deadline appear in the lower portion of the screen. When upon inputting the body of a question the checkbox is checked, a desired time is selected, and the "OK" button is pressed, the wait-time computing module 19 computes the points required in order to get a reply within the designated time period. The computed results are transmitted from the wait-time computing module 19 to the Web server 17, whereupon a screen like that in FIG. 20 is displayed by the Web browser 21. The required points herein may be found from, to cite one example of a method of computing them:

coefficient×[(average wait time per person×no. of records in question DB 14)−(reply deadline)]/ (average wait time per person×points required to go up 1 place in sequence)

The coefficient herein should be greater than 1, because elevating the sequential order for a given wait record to a higher-ranking wait record is difficult if numerous wait records whose priority level is high are present. In particular, the coefficient is determined empirically based on points and priority levels that have been necessary in order that provision of a service be performed within a designated time limit for the service.

The fact that in this way the points required in order to get a reply within the designated time period are displayed means that a questioner may check in advance how many points are required to obtain a reply within the time period the questioner desires, following from which priority-level settings are made in accordance with the reply deadline through a question acceptance-completion screen, shown exemplarily in FIG. 21.

THIRD EMBODIMENT

Configuration

Figure 22:
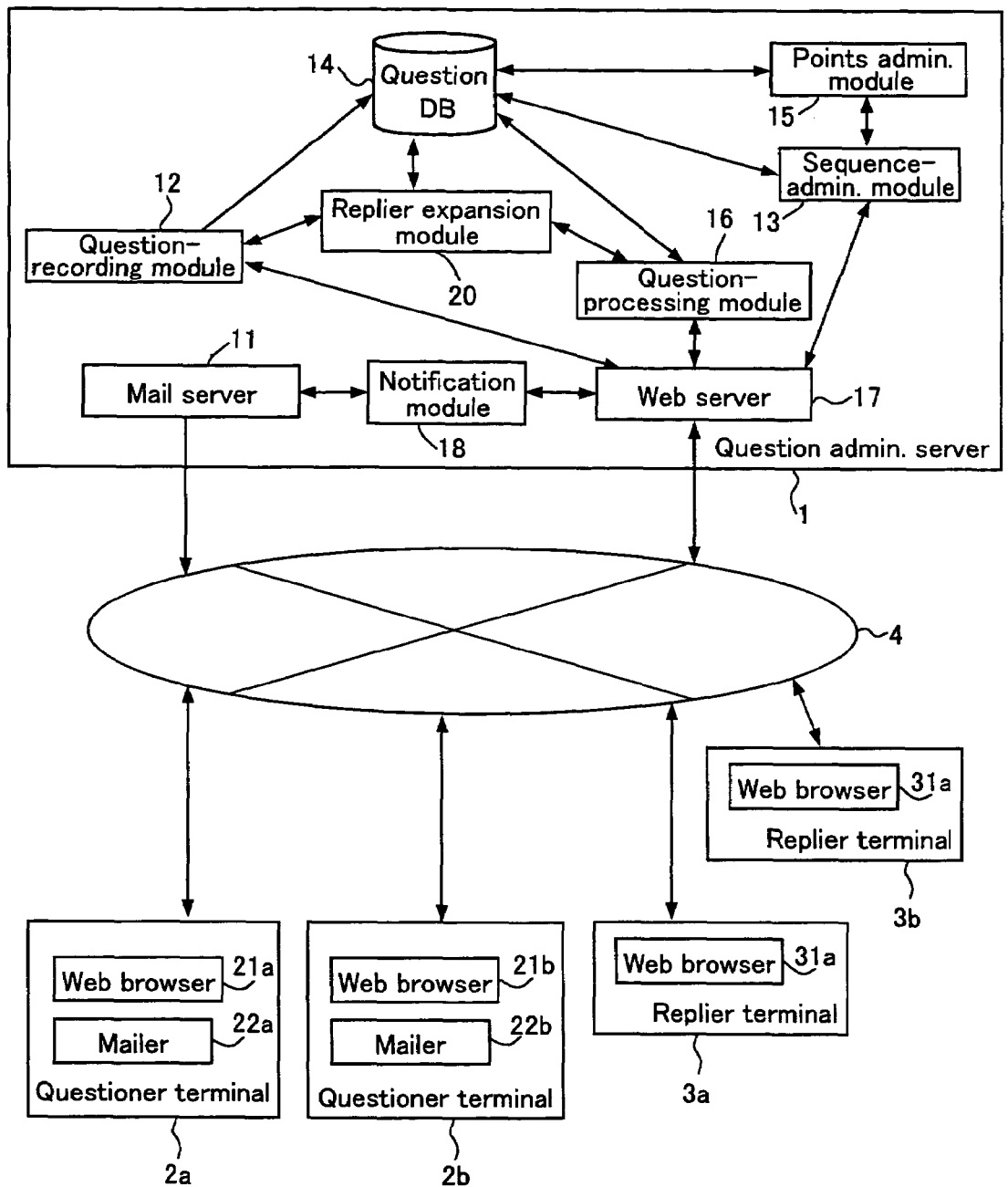
FIG. 22. is an overall configurational view of a question-acceptance system having to do with a third embodiment.

FIG. 22 is an overall configurational view of a question-acceptance system having to do with a third embodiment. This system, likewise as with the question-acceptance system pertaining to the first embodiment of the present invention, is the question administration server 1, questioner terminals 2, and replier terminal 3, connected via the network 4. The configuration and functions of the questioner terminals 2 and replier terminal 3 are the same as with the first embodiment. The question administration server 1, like the question administration server 1 in connection with the first embodiment, includes the mail server 11, the question-registering module 12, the sequence-administration module 13, the question DB 14, the points administration module 15, the question-processing module 16, the Web server 17, and the notification module 18. It then further includes a replier expansion module 20. The functions of the mail server 11, question-registering module 12, sequence-administration module 13, question DB 14, points administration module 15, question-processing module 16, Web server 17, and notification module 18 are likewise as with the first embodiment.

The replier expansion module 20 performs a later-described replier-expansion process. In this process, whether or not points corresponding to an arbitrarily determined number of users can be recovered through a questioner is judged, and if recoverable, increasing the number of replier terminals 3 into which a reply can be input is permitted. In the present system, the administrator of the question administration server 1 may exchange points recovered by the question administration server 1 from a questioner for some sort of consideration or other.

Process Flow

Figure 23:
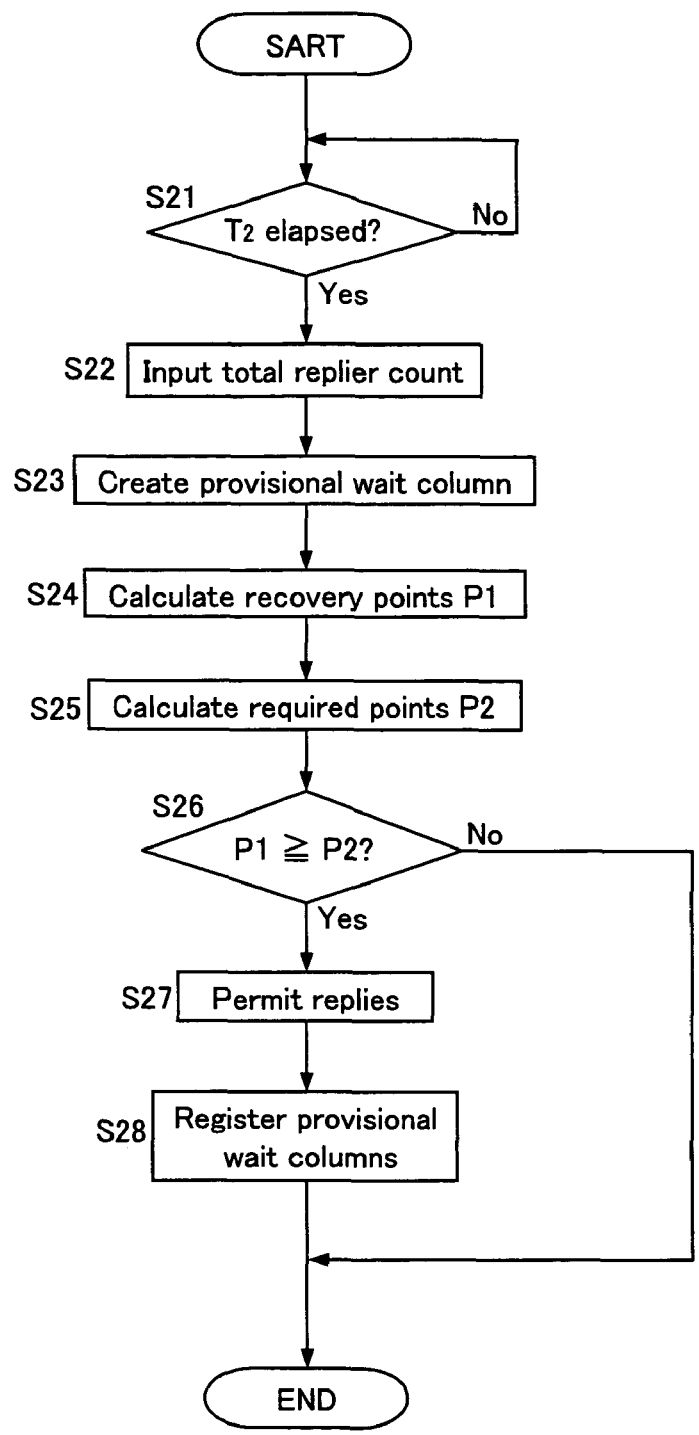
FIG. 23 is a flowchart of a replier expansion process.

FIG. 23 is a flowchart representing flow of the replier-expansion process.

Step S21: The replier expansion module 20 judges whether or not a predetermined time $t_2$, e.g., 1 hour, has elapsed. If so, step 22 ensues. If not, the aforementioned judgment is repeated until the time does elapse.

Step S22: The replier expansion module 20 accepts input, through a not-illustrated keyboard or the like, of the number of replier terminals 3 (referred to as "total replier count" hereinafter) for replying to questions in the question DB 14. The total replier count is, for example, the number of usable replier terminals 3, or number of persons who may operate a replier terminal 3.

Step S23: From a wait queue (referred to as a "current wait queue" hereinafter) formed by records currently registered in the question DB 14, the replier expansion module 20 prepares a wait queue (referred to as a "provisional wait queue" hereinafter) in which the total replier count is the total number of rows. Preparation of the provisional wait queue is performed as follows, supposing for example that the current wait queue is Wait Queue 1 in FIG. 24(a), and then supposing that the total replier count is 2. Provisional Wait Queue 2 is created by picking out, in order from higher-ranking, that number—for which the total row count in the provisional wait queue following preparation will be roughly the same number—of questions whose priority level is positive among those after the second in the sequence in wait queue 1. Other questions except for questions in Provisional Wait Queue 2 extracted from a wait queue are Provisional Wait Queue 1. FIG. 24(*b*) is provisional wait queues prepared as just noted. FIG. 24(*c*) here is Provisional Wait Queues 1', 2' and 3', which are provisional wait queues prepared as noted above, in a case in which the total replier count is 3.

Step S24: The replier expansion module 20 calculates the points (referred to as "recovery points P1" hereinafter) that may be recovered from a questioner if the wait queue were changed from a current wait queue into a provisional wait queue. The recovery points are for example points that are reduced from a question shifted to a higher rank, in the same way as with the sequence-altering process of step S113 in the foregoing first embodiment. From the provisional wait queue in FIG. 24(*b*) in this instance, because a priority-level 2 and a priority-level 3 question have each been shifted two places up in the sequence, two points apiece, for example, may be recovered from the respective questions, for a recoverable 4 points in all. Meanwhile, from the provisional wait queue in FIG. 24(*c*), because a priority-level 2 question has been shifted two places up in the sequence, two points may be recovered from that question; and because a priority-level 3 question has been shifted three places up in the sequence, three points may be recovered from that question, for a recoverable 5 points in all.

Step S25: The replier expansion module 20 calculates the necessary points (referred to as "required points P2" hereinafter) according to the total replier count. The required points herein are for example a point count that is the product of points in an equivalent value of the cost required for a reply to a single question and the total number of questions. The required points may instead of being calculated be input through means such as a keyboard.

Step S26: The replier expansion module 20 judges whether or not P1≧P2. If P1≧P2, step S17 ensues. If P1<P2, the process terminates without expansion of repliers being carried out.

Step S27: The replier expansion module 20 permits the total replier count, inputted in step S12, of replier terminals 3 to access the Web server 17.

Step S28: The replier expansion module 20 registers the provisional wait queue as a current wait queue in the question DB 14. Registering wait queues may be, to name an example, the creating and storing of a plurality of tables like that in FIG. 2 for each wait queue. In this case the sequence-altering process of the aforementioned first embodiment may be carried out for each of the registered wait queues of the plurality. By carrying out the foregoing process, in contrast to merely processing a question with a plurality of replier terminals 3, recovery of points vis-a-vis a reply being prepared through a plurality of replier terminals 3 can be reckoned on.

OTHER EMBODIMENTS (A) The foregoing embodiments 1 through 3 exemplify question-accepting systems in which the present invention is adopted. The present invention nonetheless can also be applied to other service-provision systems. In credit-card application processing systems, online sales systems, and order-taking sales systems, after a customer has applied to a provider of services or merchandise for the provision of a service or merchandise, the substance of the application will possess validity upon the service or merchandise provider carrying out some sort of screening work or the like on the application content, and ordinarily time is required for the screening or like work on individual applications. Accordingly, in cases in which for a customer's convenience altering the sequence of this work is necessary, by applying the present invention to these systems, credit-card issuing sequences, merchandise shipping sequences, order-receiving sequences, etc. can be altered without imparting a sense of unfairness to the service users and merchandise purchasers.

Figure 25:
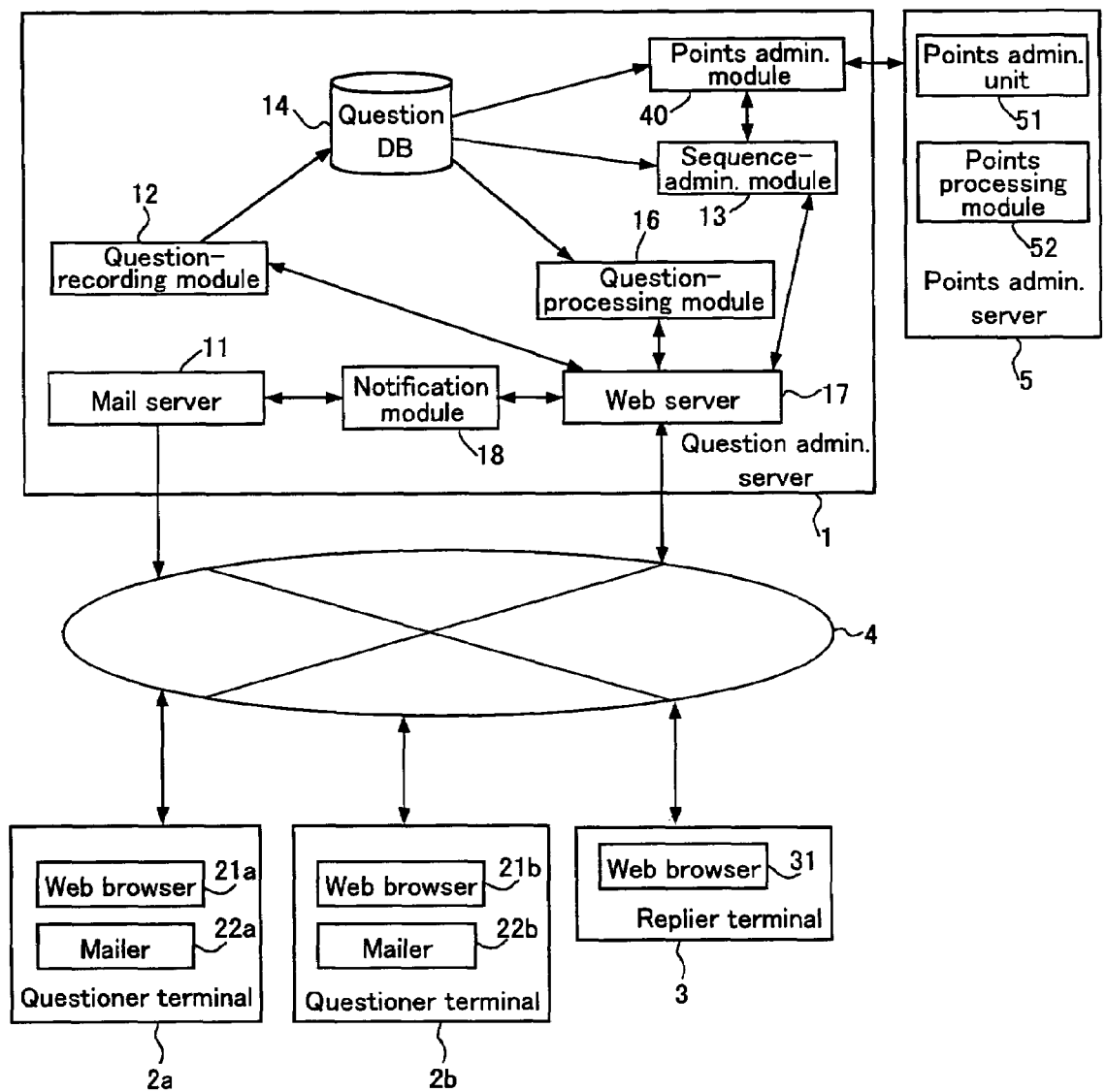
FIG. 25 is an overall configurational view illustrating an example of a question-acceptance system having to do with other embodiments.

(B) In the foregoing first through third embodiments, the current points are stored in the question DB 14. As exemplified in FIG. 25, however, the current points may be stored into a storage medium separate from the question DB 14, for example, a POS terminal, a POS host, a credit-card account payment system, or a DRAM or the like that is in another service provision system. The question-acceptance system illustrated by way of example in FIG. 25, in the question-acceptance system having to do with the first embodiment further includes a points administration server 5. The points administration server 5 has a points administration unit 51 and a points processing module 52. The points administration unit 51 is for example a DRAM or a hard disk, and stores customers' current points. The points processing module 52 issues point cards or the like, and updates the current points stored in the points administration unit 51 when disbursements are made for customer's service compensation or merchandise purchasing charges. The points administration server 5 can be configured by a publicly known POS register or the like. The question administration server 1, lacking the points administration module 15 differs from the question administration server 1 in connection with the first embodiment, and instead has a points associating module 40. The points associating module 40 connects the question administration server 1 and the points administration server 5, and enables reading out by the question administration server 1 of the current points in the points administration server 5. Thus rendering the system lets points stored from using other service-provision systems be exploited in elevating the sequential order of a record when the question-acceptance system is used. Alternatively, the question-acceptance system may be exploited to store points in another service-provision system, and the stored points may be used in the other service-provision system. In short, the points may be lent roles as currency exchangeable for some equivalent value or other, which ties in with promoting the use of service-provision systems.

(C) Computer-readable recording media on which are recorded a program for performing the sequence-altering process of the foregoing first through third embodiments are also included in the present invention. Recording media herein may be, to mention examples, computer-readable flexible disks, semiconductor memory, CD-ROMs, DVDs, MOs, and other computer-readable media.

Only selected embodiments have been chosen to illustrate the present invention. To those skilled in the art, however, it will be apparent from the foregoing disclosure that various changes and modifications can be made herein without departing from the scope of the invention as defined in the appended claims. Furthermore, the foregoing description of the embodiments according to the present invention is provided for illustration only, and not for limiting the invention as defined by the appended claims and their equivalents.

What is claimed is:

1. A method for altering service-response sequential order in which a service provider provides a service for a service request by a service requester via a network, comprising:
    a service-request acceptance step of sequentially accepting
        a service request which a service requester requests of a
        service provider, being a request for receiving a predetermined service from said service provider, and a priority level which said service requester designates for receiving said service on a priority basis and which is a second or lower order;

a first storing step of storing a plurality of wait records each of which includes data on said service, said priority level, an identifier for a service requester making said service request, and said sequential order in which said service request has been accepted in one or more wait queues, and storing said wait queues in a storing unit;

a sequence-interchange step of interchanging, according to said priority levels and to points which are required for said service requester to designate said priority level, said wait records of said service requester and of another service requester in said sequential order and interchanges, according to said priority levels and said points, said wait records in said sequential order of said service requester belonging to one of said groups, and other another service requester belonging to another of said groups;

an updating step of changing and updating in said storing unit said points for said service requester and another service requester whose wait records in said sequential order have been interchanged a sequence-interchange-request-acceptance step of accepting a request to change sequential order of said wait records;

a specifying step of specifying one of said wait records in said sequential order which will be interchanged, according to said priority level and to said points held by a sequence-interchange-requester being said requester of said request to change sequential order, with said wait record for said sequence-interchange-requester;

an inquiry step of inquiring as to whether or not said service requester for said specified wait record consents to said interchanging of sequential orders; and a consent-acceptance step of accepting consent as granted by said service requester in said inquiry step; wherein said interchange step interchanges said sequential orders in response to said consent.

2. The method for altering service-response sequential order set forth in claim 1, wherein said sequence-interchange step is conducted every predetermined time interval.

3. The method for altering service-response sequential order according to claim 1, further comprising:

a time-interval designating step of accepting designation of deadline for said service, said deadline being a period of time until said service requester receives provision of said service; and a calculation step of calculating and outputting said points and/or said priority level required for said service requester to obtain said service by said service deadline.

4. The method for altering service-response sequential order according to claim 1, further comprising a point-storing step of storing said points each service requester has.

5. The method for altering service-response sequential order according to claim 1, further comprising:

a distribution step of distributing said wait records into said one or more wait queues; and a second storing step of storing said plurality of wait queues.

6. The method for altering service-response sequential order according to claim 1, further comprising a restriction step of restricting an execution of said sequence-interchange step with respect to each of said wait records which were interchanged once within a given time period.

7. A method for altering service-response sequential order in which a service provider provides a service for a service request by a service requester via a network, comprising:

a service-request acceptance step of sequentially accepting a service requests which a service requester requests of a service provider, being a request for receiving a predetermined service from said service provider, and a priority level which said service requester designates for receiving said service on a priority basis;

a first storing step of storing a plurality of wait records each of which includes data on said service, said priority level, an identifier for a service requester making said service request, and said sequential order in which said service request has been accepted in one or more wait queues, and storing said wait queues in a storing unit;

a grouping step of dividing said wait records into groups;

a sequence-interchange step of interchanging, according to said priority levels and to points which are required for said service requester to designate said priority level, said wait records of said service requester and of another service requester in said sequential order, and said sequence-interchange step interchanges, according to said priority levels and said points, said wait records in said sequential order of said service requester belonging to one of said groups, and other another service requester belonging to another of said groups;

an updating step of changing and updating in said storing unit said points for said service requester and another service requester whose wait records in said sequential order have been interchanged;

a time-interval designating step of accepting designation of deadline for said service, said deadline being a period of time until said service requester receives provision of said service; and a calculation step of calculating and outputting said points and/or said priority level required for said service requester to obtain said service by said service deadline.

8. The method for altering service-response sequential order set forth in claim 7, further comprising:

a sequence-interchange-request-acceptance step of accepting a request to change sequential order of said wait records;

a specifying step of specifying one of said wait records in said sequential order which will be interchanged, according to said priority level and to said points held by a sequence-interchange-requester being said requester of said request to change sequential order, with said wait record for said sequence-interchange-requester;

an inquiry step of inquiring as to whether or not said service requester for said specified wait record consents to said interchanging of sequential orders; and a consent-acceptance step of accepting consent as granted by said service requester in said inquiry step; wherein said interchange step interchanges said sequential orders in response to said consent.

9. The method for altering service-response sequential order according to claim 7, wherein said sequence-interchange step is conducted every predetermined time interval.

10. The method for altering service-response sequential order according to claim 7, further comprising a point-storing step of storing said points each service requester has.

11. The method for altering service-response sequential order according to claim 7, further comprising:

a distribution step of distributing said wait records into said one or more wait queues; and a second storing step of storing said plurality of wait queues.

12. The method for altering service-response sequential order according to claim 7, further comprising a restriction step of restricting an execution of said sequence-interchange step with respect to each of said wait records which were interchanged once within a given time period.

13. A method for altering service-response sequential order in which a service provider provides a service for a service request by a service requester via a network, comprising;
   a service-request acceptance step of sequentially accepting a service request which a service requester requests of a service provider, being a request for receiving a predetermined service from said service provider, and a priority level which said service requester designates for receiving said service on a priority basis and which is a second or lower order;
   a first storing step of storing a plurality of wait records each of which includes data on said service, said priority level, an identifier for a service requester making said service request, and said sequential order in which said service request has been accepted in one or more wait queues, and storing said wait queues in a storing unit;
   a sequence-interchange step of interchanging, according to said priority levels and to points which are required for said service requester to designate said priority level, said wait records of said service requester and of another service requester in said sequential order;
   an updating step of changing and updating in said storing unit said points for said service requester and another service requester whose wait records in said sequential order have been interchanged
   a time-interval designating step of accepting designation of deadline for said service, said deadline being a period of time until said service requester receives provision of said service; and
   a calculation step of calculating and outputting said points and/or said priority level required for said service requester to obtain said service by said service deadline, and
   wherein said sequence-interchange step is conducted every predetermined time interval.

14. The method for altering service-response sequential order according to claim 13, further comprising a point-storing step of storing said points each service requester has.

15. The method for altering service-response sequential order according to claim 13, further comprising:
   a distribution step of distributing said wait records into said one or more wait queues; and
   a second storing step of storing said plurality of wait queues.

16. The method for altering service-response sequential order according to claim 13, wherein said sequence-interchange step is conducted every predetermined time interval.

17. The method for altering service-response sequential order according to claim 13, further comprising a restriction step of restricting an execution of said sequence-interchange step with respect to each of said wait records which were interchanged once within a given time period.

18. A method for altering service-response sequential order in which a service provider provides a service for a service request by a service requester via a network, comprising:
   a service-request acceptance step of sequentially accepting a service request which a service requester requests of a service provider, being a request for receiving a predetermined service from said service provider, and a priority level which said service requester designates for receiving said service on a priority basis and which is a second or lower order;
   a first storing step of storing a plurality of wait records each of which includes data on said service, said priority level, an identifier for a service requester making said service request, and said sequential order in which said service request has been accepted in one or more wait queues, and storing said wait queues in a storing unit;
   a sequence-interchange step of interchanging, according to said priority levels and to points which are required for said service requester to designate said priority level, said wait records of said service requester and of another service requester in said sequential order, where said interchange step interchanges said sequential orders in response to said consent;
   an updating step of changing and updating in said storing unit said points for said service requester and another service requester whose wait records in said sequential order have been interchanged;
   a sequence-interchange-request-acceptance step of accepting a request to change sequential order of said wait records;
   a specifying step of specifying one of said wait records in said sequential order which will be interchanged, according to said priority level and to said points held by a sequence-interchange-requester being said requester of said request to change sequential order, with said wait record for said sequence-interchange-requester;
   an inquiry step of inquiring as to whether or not said service requester for said specified wait record consents to said interchanging of sequential orders;
   a consent-acceptance step of accepting consent as granted by said service requester in said inquiry step;
   a time-interval designating step of accepting designation of deadline for said service, said deadline being a period of time until said service requester receives provision of said service; and
   a calculation step of calculating and outputting said points and/or said priority level required for said service requester to obtain said service by said service deadline.

19. The method for altering service-response sequential order according to claim 18, further comprising a point-storing step of storing said points each service requester has.

20. The method for altering service-response sequential order according to claim 18, further comprising:
   a distribution step of distributing said wait records into said one or more wait queues; and
   a second storing step of storing said plurality of wait queues.

21. The method for altering service-response sequential order according to claim 18, further comprising a restriction step of restricting an execution of said sequence-interchange step with respect to each of said wait records which were interchanged once within a given time period.

22. A device for altering service-response sequential order in which a service provider provides a service for a service request by a service requester via a network, comprising:
   service-request acceptance unit for sequentially accepting a service request which a service requester requests of a service provider, being a request for receiving a predetermined service from said service provider, and a priority level which service requester designates for receiving said service on a priority basis and which is a second or lower order;
   first storing unit for storing a plurality of wait records each of which includes data on said service, said priority level, an identifier for a service requester making said service request, and said sequential order in which said service request has been accepted in one or more wait queues, and storing said wait queues in a storing unit;

a grouping unit for dividing said wait records into groups;

sequence-interchange unit for interchanging, according to said priority levels and to points which are required for said service requester to designate said priority level, said wait records of said service requester and of another service requester in said sequential order and said sequence-interchange step interchanges, according to said priority levels and said points, said wait records in said sequential order of said service requester belonging to one of said groups, and other another service requester belonging to another of said groups;

updating unit for changing and updating in said storing unit said points for said service requester and another service requester whose wait records in said sequential order have been interchanged;

a time-interval designating unit for accepting designation of deadline for said service, said deadline being a period of time until said service requester receives provision of said service; and a calculation unit for calculating and outputting said points and/or said priority level required for said service requester to obtain said service by said service deadline.

23. A computer readable recording medium on which is recorded a program altering service-response sequential order in which a service provider provides a service for a service request by a service requester via a network, the program causing a computer to function as:

service-request acceptance unit for sequentially accepting a service request which a service requester requests a service provider, being a request for receiving a predetermined service from said service provider, and a priority level which service requester designates for receiving said service on a priority basis and which is a second or lower order;

first storing unit for storing a plurality of wait records each of which includes data on said service, said priority level, an identifier for a service requester making said service request, and said sequential order in which said service request has been accepted in one or more wait queues, and storing said wait queues in a storing unit;

a grouping unit for dividing said wait records into groups;

sequence-interchange unit for interchanging, according to said priority levels and to points which are required for said service requester to designate said priority level, said wait records of said service requester and other another service requester in said priority level, and said sequence-interchange step interchanges, according to said priority levels and said points, said wait records in said sequential order of said service requester belonging to one of said groups, and other another service requester belonging to another of said groups;

updating unit for changing and updating in said storing unit said points for said service requester and another service requester whose wait records in said sequential order have been interchanged;

a time-interval designating unit for accepting designation of deadline for said service, said deadline being a period of time until said service requester receives provision of said service; and a calculation unit for calculating and outputting said points and/or said priority level required for said service requester to obtain said service by said service deadline.

* * * * *

UNITED STATES PATENT AND TRADEMARK OFFICE
CERTIFICATE OF CORRECTION

| | |
|---|---|
| PATENT NO. | : 7,634,573 B2 |
| APPLICATION NO. | : 10/636809 |
| DATED | : December 15, 2009 |
| INVENTOR(S) | : Ryuichi Matsukura et al. |

It is certified that error appears in the above-identified patent and that said Letters Patent is hereby corrected as shown below:

Column 19, Lines 8-9, change "comprising;" to --comprising:--.

Signed and Sealed this

Sixteenth Day of March, 2010

David J. Kappos
*Director of the United States Patent and Trademark Office*

UNITED STATES PATENT AND TRADEMARK OFFICE
CERTIFICATE OF CORRECTION

PATENT NO. : 7,634,573 B2 Page 1 of 1
APPLICATION NO. : 10/636809
DATED : December 15, 2009
INVENTOR(S) : Matsukura et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1449 days.

Signed and Sealed this

Twenty-first Day of December, 2010

David J. Kappos
*Director of the United States Patent and Trademark Office*